United States Patent [19]

Okubo et al.

[11] Patent Number: 4,903,808
[45] Date of Patent: Feb. 27, 1990

[54] GUIDE DEVICE FOR RELEASE BEARING IN PULL TYPE FRICTION CLUTCH

[75] Inventors: Kiyokazu Okubo; Shinji Fujimoto, both of Utsunomiya, Japan

[73] Assignee: Honda Giken Kogyo Kabushiki Kaisha, Tokyo, Japan

[21] Appl. No.: 358,115

[22] Filed: May 30, 1989

[30] Foreign Application Priority Data

Jun. 1, 1988 [JP] Japan .............................. 60-71735[U]

[51] Int. Cl.$^4$ ............................................. F16D 23/14
[52] U.S. Cl. ................................... 192/98; 74/606 R; 192/110 B
[58] Field of Search .................... 192/98, 99 S, 109 R, 192/110 B, 110 R; 74/606 R

[56] References Cited

U.S. PATENT DOCUMENTS

| | | | |
|---|---|---|---|
| 2,091,409 | 8/1937 | Lewis .............................. | 192/110 R |
| 4,234,067 | 11/1980 | Billet ........................ | 192/98 |
| 4,611,700 | 9/1986 | Després ................................ | 192/98 |

Primary Examiner—Leslie A. Braun
Assistant Examiner—Richard M. Lorence
Attorney, Agent, or Firm—Armstrong, Nikaido, Marmelstein, Kubovcik & Murray

[57] ABSTRACT

A guide device for a release bearing used in a pull type friction clutch in which a cylindrical shaft portion projecting out of a transmission case in inserted into, and fitted in the inner periphery of, a release bearing of a clutch unit assembled to the crank shaft of an engine, and a release fork assembled to the transmission case is engaged with engagement portions formed on one of the release bearing members. Projecting pieces are formed on the one of the release bearing members. Each projecting piece extends outwards in a diametrical direction. Guide grooves are formed on the transmission case receiving the projecting pieces inserted thereinto from the axially front side of the cylindrical shaft portion keeping the release bearing member properly aligned while the clutch is being assembled.

6 Claims, 3 Drawing Sheets

GUIDE DEVICE FOR RELEASE BEARING IN PULL TYPE FRICTION CLUTCH

BACKGROUND OF THE INVENTION

This invention relates chiefly to a guide device for a release bearing in a pull type friction clutch for a vehicular engine.

Japanese Unexamined Patent Application Publications, Tokkai Sho No. 58-5535 and/or Tokkai Sho No. 61-118129 disclose a pull type friction clutch in which a cylindrical shaft portion projecting out of a transmission case is inserted into, and fitted in the inner periphery of, a release bearing for a clutch unit attached to the crank shaft of an engine. A release fork assembled to the transmission case is engaged with an engagement portion formed in one of the inner and outer races of the release bearing.

To assemble a pull type friction clutch to an engine, it is usual that a clutch unit with a release bearing already assembled thereto is assembled to the engine, a transmission case is then assembled to the engine in such a manner that a cylindrical shaft portion projecting out of the transmission case may be inserted into the shaft hole of the release bearing, and thereafter a release fork is engaged with an engagement portion provided on one of the inner and outer races of the bearing. In such a case, however, it sometimes occurs that the phase alignment of the engagement portion of the member of the release bearing becomes improper with respect to the release fork if the cylindrical shaft portion and/or the release fork accidentally hit the release bearing when the transmission case is being assembled to the engine or when the release fork is being engaged with the engagement portion. For this reason, the assembly work had to be carried out with utmost care to avoid occurrence of an improper phase alignment, thus resulting a lower productivity.

This invention has been devised to solve the above-described problem and has for its object to provide a guide device designed to make it easy to carry out the assembling of the transmission case and the engagement of the release fork.

SUMMARY OF THE INVENTION

To achieve the above object, the present invention provides a guide device for a release bearing used in a pull type friction clutch in which a cylindrical shaft portion projecting out of a transmission case is inserted into, and fitted in the inner periphery of, a release bearing of a clutch unit assembled to the crank shaft of an engine, and a release fork assembled to the transmission case is engaged with engagement portions formed on one of the release bearing members. The guide device comprises projecting pieces formed on the one of the release bearing members each projecting piece extending outwards in a diametrical direction, and guide grooves formed on the transmission case for the projecting pieces to be inserted thereinto from the axially front side of the cylindrical shaft portion.

When the transmission case is moved toward the axially front side with respect to the engine for assembling the transmission case to the engine, the projecting pieces on the one release bearing member having the engagement portions formed thereon are guided by the guide grooves of the transmission case so as to set the one member properly positioned with respect to the transmission case. Therefore, when the release fork is engaged, the front end portion thereof comes in contact with the one release bearing member to hold the latter so as not to turn, so that the assembly steps to assemble the transmission case to the engine and engage the release fork with the engagement portions can be accomplished easily.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
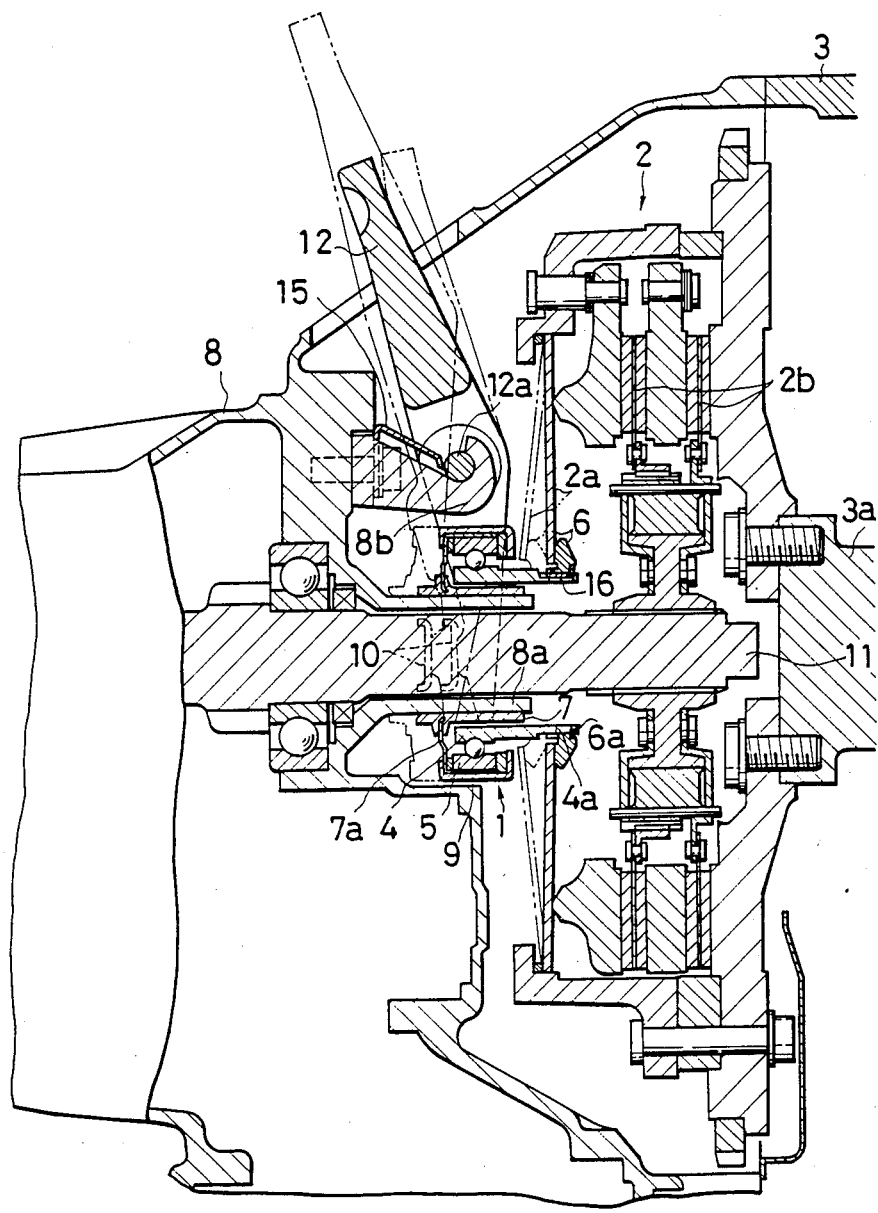
FIG. 1 is a sectional view of a pull type friction clutch equipped with the guide device of the present invention according to one embodiment thereof.
Figure 2:
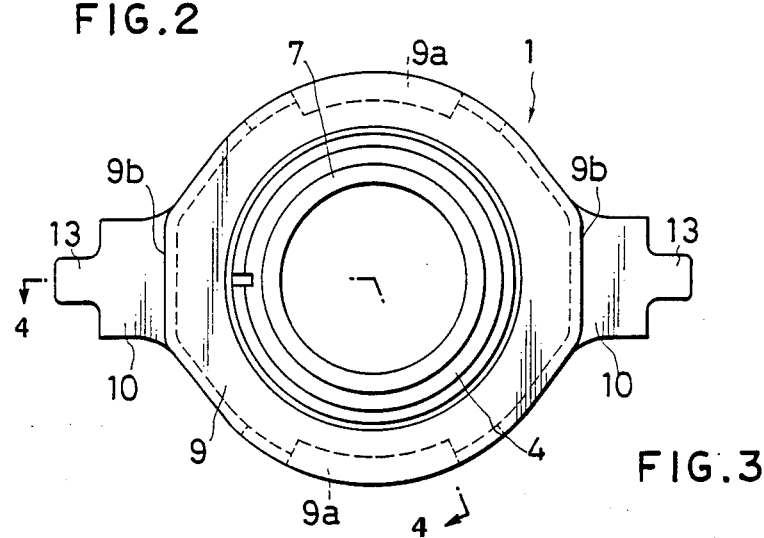
FIG. 2 is a front view of the release bearing according to the present invention.
Figure 3:
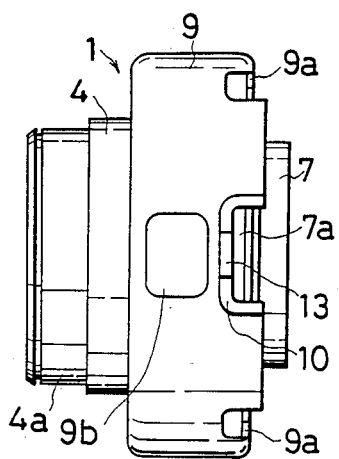
FIG. 3 is a right-side view thereof.
Figure 4:
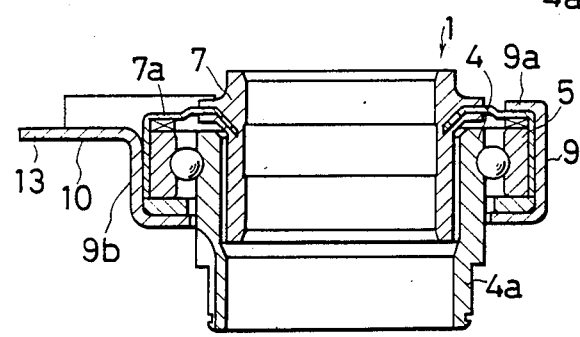
FIG. 4 is a sectional view taken along the line IV—IV in FIG. 2.
Figure 5:
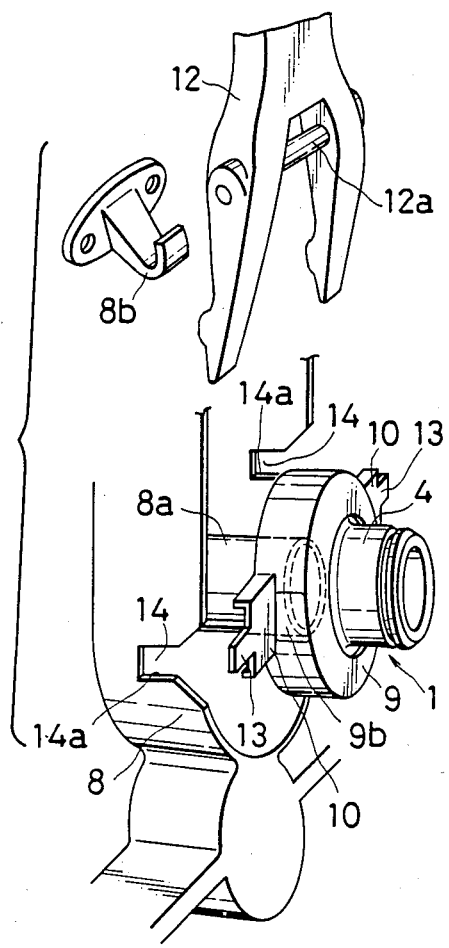
FIG. 5 is an exploded perspective view of important portions thereof.

FIG. 1 shows a clutch unit assembled to a crank shaft 3a of an engine 3 and having a release bearing 1. The release bearing 1 comprises an inner race 4 and an outer race 5. A stopper member 6 that engages with a diaphragm spring 2a of the clutch unit 2 is securely fastened by a stop ring 6a to an extension portion 4a extending in the axial direction from the inner race 4. A sleeve 7 fitted over a cylindrical shaft portion 8a projecting out of a transmission case 8 is securely fastened to a support plate 7a fixedly fitted over the outer race 5 so that the sleeve 7 may abut with the shaft hole of the inner race 4.

A cap-like outer plate 9 is fitted over the outer race 5 to cover the outer race and is fastened securely thereto by caulking portions 9a, 9a extending from the outer plate 9. Tonque-like engagement portions 10, 10 are provided on both sides of the plate 9 in a diametrical direction.

If the outer plate 9 should be fastened to the inner race, the inner race 4 would have to have its cylindrical portion axially extended further so as to have the outer plate 9 fitted thereover, thus resulting in a more complicated structural shape of the inner race 4. However, when the outer plate 9 is fastened to the outer race 5 by caulking as in the foregoing embodiment it is not necessary to have the cylindrical portion axially extended further as mentioned above, so that the structural shape of the release bearing 1 can be made simpler.

Now, the clutch unit 2 having the release bearing 1 already attached thereto in advance is assembled to the engine 3 and the transmission case 8 is attached to the engine 3 in such a manner that the cylindrical shaft portion 8a may be inserted into the sleeve 7 and the main shaft 11 into the shaft hole of the friction plate 2b of the clutch unit 2. Thereafter, a release fork 12 is engaged with the engagement portions 10 so as to hook up a support shaft 12a of the release fork 12 with a support portion 8b provided on the transmission case 8. In this condition, the lower end portion of the release fork 12 is slanted leftward in FIG. 1 so that the diaphragm spring 2a may be pulled leftwards through the release bearing 1 to bring the clutch unit 2 to the disengaged position.

Integrally formed with the outer plate 9 securely fastened to the outer race 5 are projecting pieces 13, each of which extends further outwards in the diametrical direction from each engagement portion 10. Guide grooves 14 are provided on the transmission case 8 and are formed to permit the projecting pieces 13 to be inserted thereinto from the axially front side of the cylindrical shaft portion 8a.

Each guide groove 14 can be formed with its opening end side progressively wider toward the front end.

Locking up of the outer race 5 against turning during the operation of the relase fork 12 is carried out by contact of the respective projecting pieces 13 with groove walls 14a of the respective guide grooves 14.

It is therefore feared that the transmission case which is usually made of an aluminum alloy will wear due to this contact over an extended period of time of use. In this embodiment, therefore, there are provided on the outer periphery of the outer plate 9 of the outer race 5 a pair of flat contact faces 9b with which the inner side surfaces of the release fork 12 are to come in contact, so that the outer race 5 can be locked against turning when the release fork 12 is in contact with the contact faces 9b. This prevents wear of the groove walls 14a of the guide grooves 14 which may be otherwise caused by the projecting pieces 13 contacting the groove walls 14a. A spring plate 15 is provided on the support portion 8b in order to hold the release fork 12 against slipping out of place. A key 16 is used to hole the stopper member 6 on the inner race 4 against turning.

According to the present invention, one release bearing member provided with the engagement portions is positioned correctly by means of guide grooves formed on the transmission case, so that the assembling steps to assemble the transmission case to the engine and engage the release fork with the engagement portions can be carried out easily without fear of the one member of the release bearing becoming displaced to be out of phase alignment. This constitutes the advantage of the present invention, in that is results in a higher productivity.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A guide device for a release bearing used in a pull type friction clutch in which a cylindrical shaft portion projecting out of a transmission case in inserted into, and fitted in the inner periphery of, a release bearing of a clutch unit assembled to the crank shaft of an engine, and a relase fork assembled to the transmission case is engaged with engagement portions formed on one of the release bearing members, said guide device comprising:

projecting pieces formed on said one of the release bearing members, each projecting piece extending outwards in a diametrical direction; and guide grooves formed on the transmission case receiving said projecting pieces inserted thereinto from the axially front side of the cylindrical shaft portion keeping said one of the release bearing members properly aligned while the clutch is being assembled.

2. The guide device as set forth in claim 1, wherein flat contact faces adapted to engage with inner side surfaces of the release fork are formed on the outer periphery of said one of the release bearing members.

3. The guide device as set forth in claim 1 wherein said one of the release bearing members includes an outer race of the release bearing, and an outer plate fitted over said outer race, said engagement portions and said projecting pieces being integrally formed with said outer plate, and the outer plate is fastened to the outer race by caulking.

4. The guide device as set forth in claim 2 wherein said one of the release bearing members includes an outer race of the release bearing, and an outer plate fitted over said outer race, said engagement portions and said projecting pieces being integrally formed with said outer plate, and the ouer plate is fastened to the outer race by caulking.

5. The guide device as set forth in claim 3, wherein said projecting pieces extend radially outwards from said engagement portions.

6. The guide device as set forth in claim 4, wherein said projecting pieces extend radially outwards from said engagement portions.

* * * * *

UNITED STATES PATENT AND TRADEMARK OFFICE
CERTIFICATE OF CORRECTION

PATENT NO. : 4,903,808
DATED : February 27, 1990
INVENTOR(S) : OKUBO et al

It is certified that error appears in the above-identified patent and that said Letters Patent is hereby corrected as shown below:

On the cover page, Item [30], "60-71735[U]" should read --63-71735[U]--.

Signed and Sealed this

First Day of October, 1991

Attest:

HARRY F. MANBECK, JR.

Attesting Officer

Commissioner of Patents and Trademarks